United States Patent
Berezowski et al.

Patent Number: 6,075,551
Date of Patent: *Jun. 13, 2000

[54] VIDEO PROMOTION SYSTEM WITH FLEXIBLE LOCAL INSERTION CAPABILITIES

[75] Inventors: David Michael Berezowski; John Garret Thompson, both of Tulsa; Richard E. Millar, Broken Arrow, all of Okla.

[73] Assignee: United Video Properties, Inc., Tulsa, Okla.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/889,321
[22] Filed: Jul. 8, 1997
[51] Int. Cl.⁷ ....................................................... H04N 7/10
[52] U.S. Cl. ....................... 348/9; 348/6; 348/7; 348/722; 386/55
[58] Field of Search ................................. 348/7, 473, 9, 348/12, 722, 6; 386/55

[56] References Cited

U.S. PATENT DOCUMENTS

| | | | |
|---|---|---|---|
| 4,814,883 | 3/1989 | Perine et al. | 348/473 |
| 5,424,770 | 6/1995 | Schmelzer et al. | 348/9 |
| 5,469,270 | 11/1995 | Yamamoto | 386/55 |
| 5,559,548 | 9/1996 | Davis et al. | 348/6 |
| 5,568,275 | 10/1996 | Norton et al. | 386/55 |
| 5,635,978 | 6/1997 | Alten et al. | 348/7 |
| 5,652,615 | 7/1997 | Bryant et al. | 348/9 |
| 5,659,351 | 8/1997 | Huber | 455/4.2 |
| 5,732,184 | 3/1998 | Chao et al. | 386/55 |
| 5,822,018 | 10/1998 | Farmer | 348/705 |
| 5,911,030 | 6/1999 | Kikuchi et al. | 386/55 |
| 5,969,716 | 10/1999 | Davis et al. | 386/55 |

FOREIGN PATENT DOCUMENTS

| | | | |
|---|---|---|---|
| 0 620 689 A1 | 10/1994 | European Pat. Off. | H04N 7/16 |
| WO 95/28055 | 10/1995 | WIPO | H04N 5/445 |

*Primary Examiner*—Andrew I. Faile
*Assistant Examiner*—Reuben M. Brown
*Attorney, Agent, or Firm*—Fish & Neave; G. Victor Treyz; James A. Leiz

[57] ABSTRACT

A system is provided for supplying globally distributed video promotional information to cable systems. The cable systems contain local promotion units that distribute the globally distributed promotional information to televisions via a dedicated television channel. The local promotion unit is used to locally insert advertisements and other local promotional information. Local insertion is accomplished during local insertion opportunities. Local insertion opportunities may be provided at varying start times and may have varying durations. Local insertions may be made using varying media types, such as video, graphics, and text.

66 Claims, 6 Drawing Sheets

10

PROMOTIONAL INFORMATION
(GLOBALLY DISTRIBUTED OR
LOCALLY INSERTED)

14

| FEB. 24 | 4:00 | 4:30 | 5:00 |
|---|---|---|---|
| 15 MAX | THERE GOES THE NEIGHBORHOOD (COMEDY) | | |
| 16 | MURDER BY DEATH (COMEDY)(PG)(CC) | | |
| 17 TJC | TULSA PUBLIC SCHOOLS (CC) | | |

12

SCROLLING

FIG. 1
PRIOR ART

• LOCAL INSERTION OPPORTUNITY
(FIXED LOCATION AND FIXED DURATION)

| | START TIME | OPTION 1 | OPTION 2 | OPTION 3 | OPTION 4 | OPTION 5 |
|---|---|---|---|---|---|---|
| LOCAL PERIOD 1 | hh:05:43 | :30 VGT | 1:00 V | 2:00 V | 1:00 V | :30 VGT |
| | hh:06:45 | :30 VGT | 1:00 V | | | 1:00 V |
| | hh:07:47 | :30 VGT | | | :30 VGT :30 VGT | :30 VGT |
| | hh:08:18 | :30 VGT | :30 VGT 1:00 V | :30 VGT 2:00 V | :30 VGT 1:00 V | :30 VGT :30 VGT |
| | hh:09:20 | :30 VGT | 1:00 V | | | |
| LOCAL PERIOD 2 | hh:18:56 | :30 VGT | :30 VGT 1:00 V | :30 VGT 2:00 V | :30 VGT :30 VGT | 1:00 V |
| | hh:19:58 | :30 VGT | | | | :30 VGT |
| | hh:21:00 | :30 VGT | 1:00 V | | | |
| | hh:22:02 | :30 VGT | 1:00 V | 2:00 V | 1:00 V | :30 VGT |
| | hh:22:33 | :30 VGT | | | | 1:00 V |
| | hh:23:35 | :30 VGT | | | | |
| LOCAL PERIOD 3 | hh:35:43 | :30 VGT | 1:00 V | :30 VGT 2:00 V | :30 VGT :30 VGT | :30 VGT |
| | hh:36:45 | :30 VGT | :30 VGT 1:00 V | | :30 VGT 1:00 V | :30 VGT :30 VGT |
| | hh:37:47 | :30 VGT | | | | 1:00 V |
| | hh:38:18 | :30 VGT | | | | :30 VGT |
| | hh:39:20 | :30 VGT | | | | |
| LOCAL PERIOD 4 | hh:48:56 | :30 VGT | 1:00 V | | :30 VGT :30 VGT | :30 VGT :30 VGT |
| | hh:49:58 | :30 VGT | | | | 1:00 V |
| | hh:51:00 | :30 VGT | | | | :30 VGT |
| | hh:52:02 | :30 VGT | | | | |
| | hh:52:33 | :30 VGT | | | | |
| | hh:53:35 | :30 VGT | | | | |

6,075,551

VIDEO PROMOTION SYSTEM WITH FLEXIBLE LOCAL INSERTION CAPABILITIES

BACKGROUND OF THE INVENTION

This invention relates to video promotion systems such as those containing electronic television program guide services. More particularly, the invention relates to video promotion systems in which globally distributed promotional information may periodically be replaced with locally inserted promotional information.

A large number of television channels are available over cable and satellite television systems. Television viewers have traditionally consulted preprinted television program listings to determine the programs scheduled to be broadcast on a particular day. More recently, television-based program guides have been developed that allow television viewers to view television program listings directly on their television sets.

For example, the Prevue® Channel is a scrolling television program guide that a cable system operator may make available to subscribers over a dedicated television channel. Viewers can tune to the appropriate television channel to view program listings for television programs that are currently being broadcast and that are scheduled to be broadcast in the next few hours.

In the Prevue® Channel display, television program listings are provided on the lower portion of the display as a continuously scrolling grid. The upper portion of the display screen is used to display nationally distributed promotional information, such as promotional videos for upcoming pay-per-view events or premium channel movies. Promotional videos are generally provided using two simultaneous satellite feeds. The cable system operator may choose between the two feeds, so that the promotional video information displayed in the upper portion of the screen is as closely tailored as possible to the programming mix provided by that cable system. Promotional information of the type that is provided on the satellite video feeds may also be nationally distributed using prerecorded laser disks.

In addition to allowing a cable system operator to promote upcoming events on the system, the Prevue® Channel system allows cable system operators to insert local material. Local insertion capabilities are important, because cable system operator can generate revenue from local advertisements and because cable system operators may wish to insert local announcements to reach their viewers. However, previously available local insertion capabilities were somewhat inflexible. For example, cable system operators had to make local insertions according to a single national schedule of fixed start times. In addition, all local insertions had similar fixed durations (generally 30, 60, or 120 seconds). Although some cable system operators could locally insert video materials while other cable system operators could insert graphics or text, it was not possible for a single cable system operator to locally insert a mix of text, graphics, and videos.

It is therefore an object of the present invention to provide a video promotion system having more flexible local insertion capabilities than were previously available.

SUMMARY OF THE INVENTION

This and other objects of the invention are accomplished in accordance with the principles of the present invention by providing a video promotion system with various options for inserting local promotional information in place of globally distributed promotional information. The video promotion system may have a main facility for providing globally distributed (e.g., nationally distributed) promotional information. Globally distributed promotional information may include promotional videos for upcoming pay-per-view or premium television channel events and may include national advertisements. Globally distributed promotional information may be distributed by satellite to multiple television distribution facilities (e.g., cable system headends).

Another type of information that may be provided globally by the video promotion system is television program guide information. For example, television listings data may be provided to each television distribution facility from the main facility by satellite. The television distribution facilities contain equipment for processing the television program listings data and for providing a corresponding television program guide. For example, the television distribution facilities may generate a scrolling television program guide from the television listings data.

Each television distribution facility that receives the globally distributed promotional information and the television program guide information provides this information to the television units (e.g., televisions) of viewers who are connected to the television distribution facility. Globally distributed promotional information and television program guide information may be provided to the television units on a dedicated television channel.

Globally distributed promotional information is continuously provided according to an hourly schedule. The hourly schedule may be divided into national periods and local periods. During national periods, only globally distributed promotional information is provided. During local periods, opportunities are provided for inserting local materials. Each time a local insertion opportunity is provided, a television distribution facility may insert local material, such as a local advertisement, in place of the globally distributed promotional information.

The local insertion opportunities provided by the present system allow local materials of varying media types to be inserted. For example, some local insertions may be video, some local insertions may be graphics, and some local insertions may be text. In addition, the start times of the local insertion opportunities may vary (i.e., they are not limited to a rigid, uniformly-distributed pattern). The durations of the local insertion opportunities may also vary. For example, some local insertion opportunities may be 30 seconds in length, whereas other local insertion opportunities for the same television distribution facility may be 1 or 2 minutes in length.

A cable system operator at a given television distribution facility may select from among various different local insertion opportunity schedule options. Once this information has been registered by the main facility, the main facility can supply the given television distribution facility with configuration information for the television facility equipment that reflects the chosen schedule option. During operation of the system, the main facility transmits video control commands to the television distribution facilities at the start time of each local insertion opportunity. The video control commands preferably contain sufficient labeling information to allow the television distribution facilities to determine which types of local insertion opportunities are being provided at a given time.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
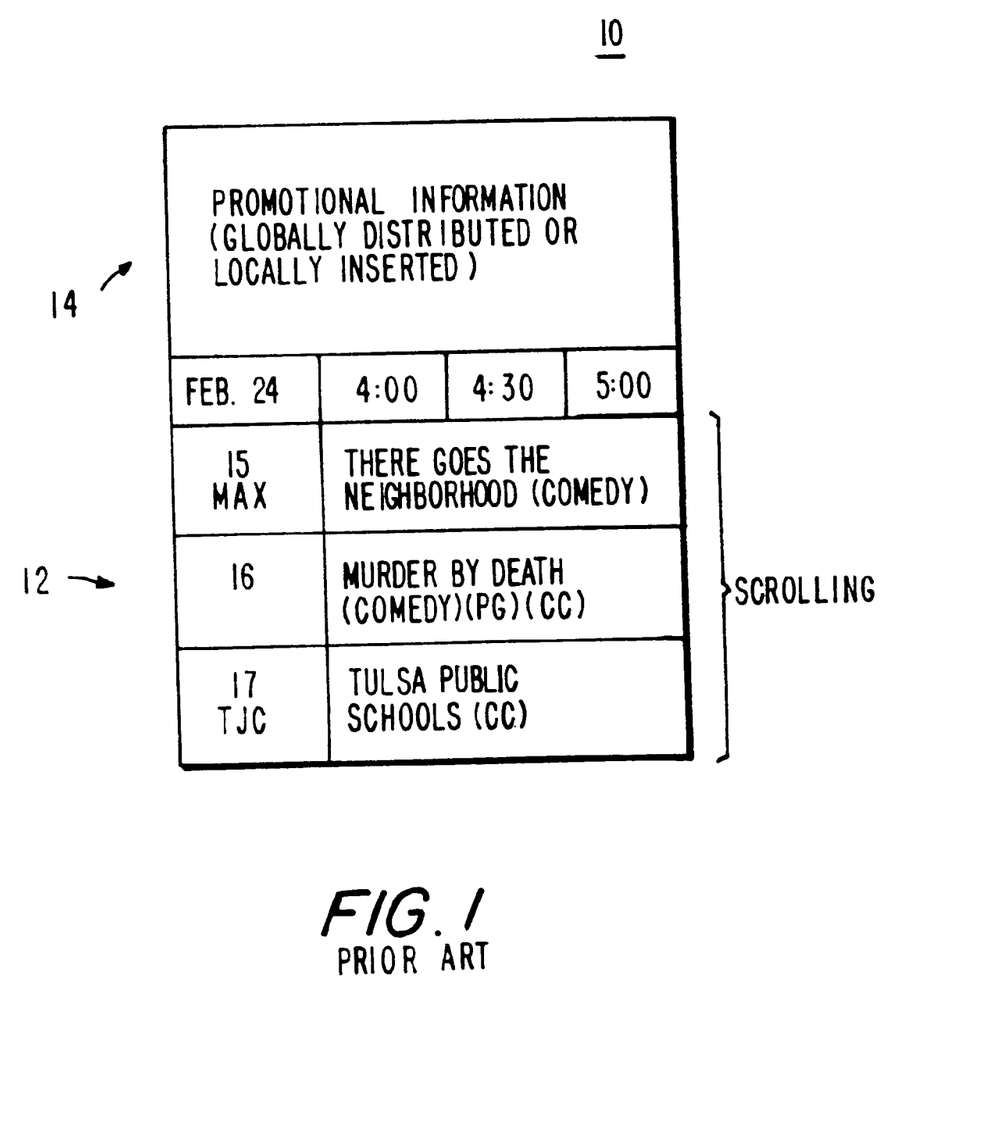
FIG. 1 is a view of a display screen in a prior art video promotion system in which the upper portion of the screen is used to display promotional information and the lower portion of the screen is used to display scrolling television program listings.

A display screen 10 of a prior art video promotion system is shown in FIG. 1. Television program listings 12 are provided on the lower portion of display screen 10. Promotional information 14, such as promotional and advertising videos, text, and graphics, are displayed on the upper portion of display screen 10.

Display screen 10 is made available to viewers in a cable system on a dedicated television channel. When a viewer is interested in reviewing current program listings or viewing promotional information, the viewer can tune to that channel.

Television program listings 12 are provided by a character generator unit located in the headend facility of the cable system. The character generator unit periodically receives data for the program listings from a central uplink facility via satellite. Program listings 12 are provided in the form of a continuously scrolling grid. Program listings 12 primarily contain program guide information for upcoming television programs, but may also include program summaries, weather information, logos, or messages.

While the lower portion of screen 10 is being used to display program listings 12, the upper portion of screen 10 is used to display nationally distributed promotional information, such as promotional videos for pay-per-view or premium channel events. Nationally distributed promotional videos are typically provided on the upper portion of screen 10 by simultaneously supplying two video feeds to the character generator unit. One of the two videos is displayed on the upper portion of screen 10 based on previously downloaded preferences. For example, the video from the first feed may be displayed in the upper left corner of display screen 10 (i.e., on the left side of the area reserved for promotional information 14) while corresponding text is displayed in the upper right corner. Alternatively, the video from the second feed may be displayed in the upper right corner while text is displayed in the upper left corner. Nationally distributed advertising videos are also shown periodically in the upper portion of display screen 10.

Figure 2:
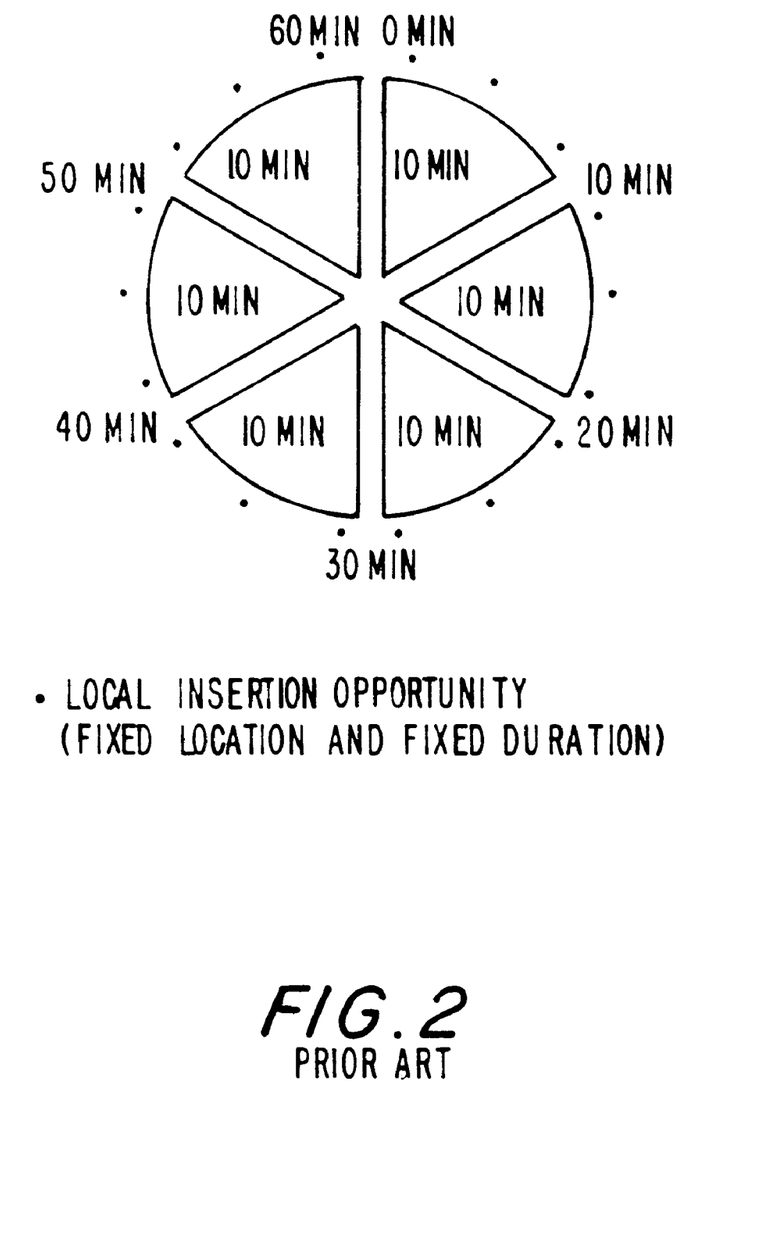
FIG. 2 is a schematic diagram of a prior art local insertion opportunity schedule for a video promotion system.

The cable system operator may insert local material into the upper portion of screen 10 during certain predefined local insertion opportunities (sometimes called "local avails"). However, these local insertion opportunities have a single fixed duration and are provided according to a single fixed schedule. As shown in FIG. 2, there are three local insertion opportunities in each 10 minute period in an hour, which provides a total of 18 local insertion opportunities. Each local insertion opportunity has a duration of 30 seconds and has a start time that is evenly spaced from adjacent start times.

Cable system operators typically insert advertizing videos during the local insertion opportunities. Cable system operators without local video insertion capabilities may elect to display text or graphics rather than videos. However, multiple media types may not be intermixed. For example, a cable system operator who displays videos may not display graphics. If the cable system operator wishes to display graphics, videos may not be displayed.

In accordance with the present invention, materials based on video, text, and graphics may be inserted in any desired combination. Local insertion opportunities are no longer limited to a single fixed duration or evenly-spaced start times. In addition, multiple local insertion opportunity schedule options may be provided.

Figure 3:
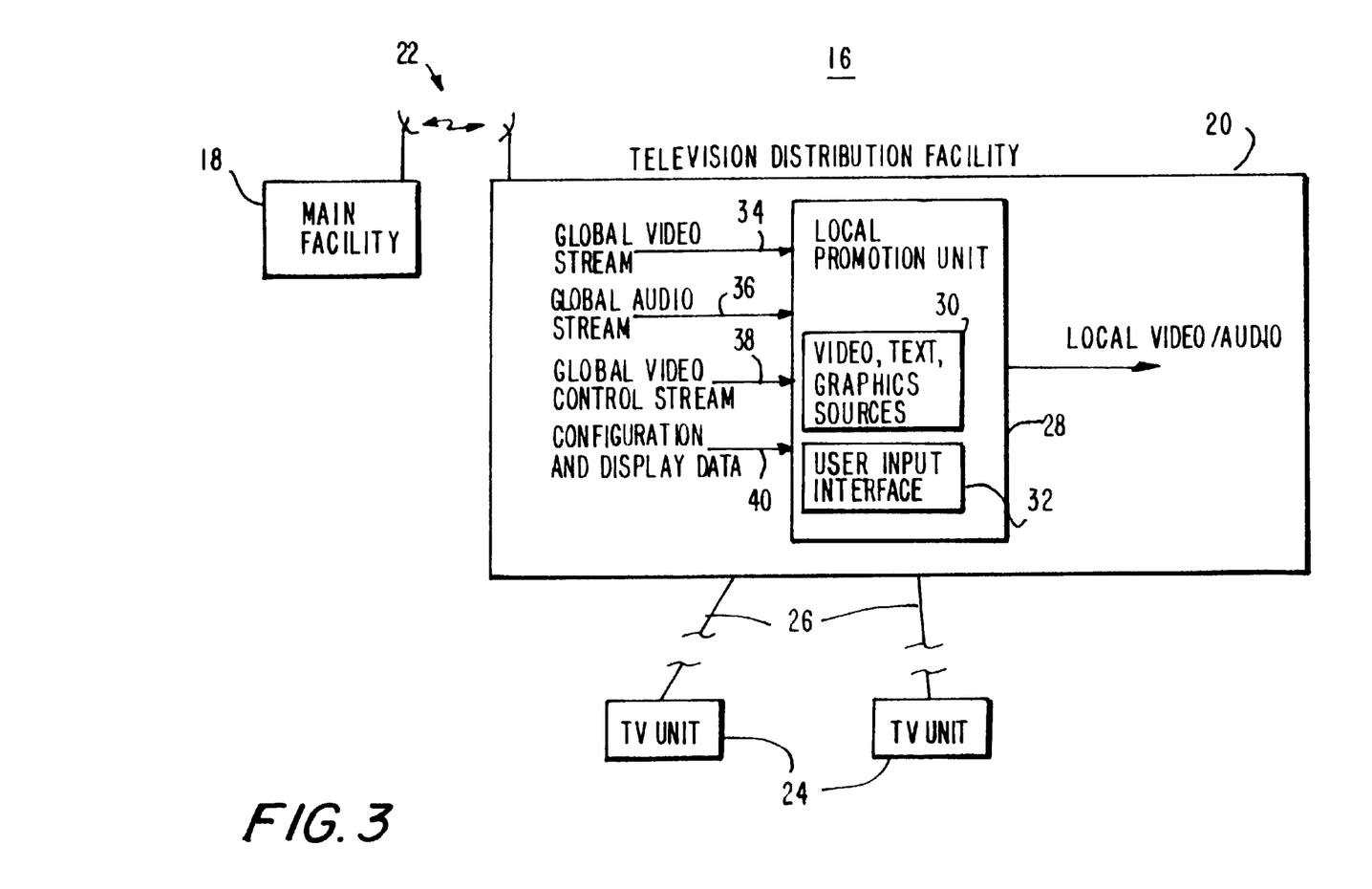
FIG. 3 is a schematic diagram of an illustrative video promotion system in accordance with the present invention.

As shown in FIG. 3, system 16 of the present invention has main facility 18, which is preferably a central satellite uplink facility. Main facility 18 is interconnected with multiple television distribution facilities such as television distribution facility 20 via satellite link 22. Television distribution facility 20, which is preferably a cable system headend, distributes conventional television channels and a dedicated promotional video channel to television units 24 over television distribution links 26. Television units 24 are preferably conventional television sets, but may be any suitable equipment with the ability to receive a desired television channel. Television distribution links 26 may be coaxial cable links, fiber optic links, microwave links, satellite links, or a combination of any such suitable television distribution links.

Television distribution facility 20 contains local promotion unit 28, which is preferably a microprocessor-based computer system with data input ports, video overlay and character generating capabilities, local memory, and disk data storage. Local promotion unit 28 may be based on a computer such as the Amiga 2000 computer having a video genlock (generator synch lock) card. Local promotion unit 28 contains video, text, and graphics sources 30. Sources 30 may include a videodisc player or similar equipment, so that promotional information can be distributed to television distribution facility 20 on media such as laser disks or digital videodiscs. Text and graphics information for local insertion may be provided on diskette or other suitable media or may be communicated to local promotion unit 28 via modem link, etc. Similarly, videos for local insertion may be provided on videocassette, videodisc or other suitable media. Videos for local insertion may also be provided by transmitting files to local promotion unit 28 over a network or via modem link.

Users at television distribution facility 20 may control the operation of a limited number of functions of local promotion unit 28 by entering commands with user input interface 32. User input interface 32 may be a pointing device, keyboard, or other suitable user interface. If desired, local promotion unit 28 may also accept local input from a locally stored control file. If local input is accepted from user interface 32 or from a control file, local promotion unit 28 preferably uses globally controlled passwords or other suitable techniques to allow the video promotion service provider at main facility 18 to maintain centralized control over the use of the video promotion service.

Main facility 18 preferably provides promotional information including national advertisements and video feeds for the upper left and upper right portions of the display screens of TV units 24 in the form of a global video stream at input 34 and a global audio stream at input 36. The global video stream and global audio stream are distributed globally (i.e., on a national basis or other suitable large-scale area).

Main facility 18 also preferably provides a global video control stream that is received at input 38 of local promotion unit 28. The video control stream contains commands synchronized to the content of the global video stream. In particular, video control commands in the video control stream are used to alert local promotion unit 28 at the start of each local insertion opportunity. Video control commands are also used to coordinate other local promotion unit functions. For example, video control commands may relate to display options such as how the local promotion unit 28 is to determine which video feed (left or right) is to be displayed during global video promotion periods. Prior to displaying a national advertising video, a control command may be sent to local promotion unit 28 to instruct local promotion unit 28 to clear the upper portion of the display screen. The video control stream is distributed globally, but may use regional addressing, if desired.

Local promotion unit 28 receives a general purpose data stream containing configuration and display data at input 40. In contrast to the video control stream, which is preferably provided in real time in synchronization with the video stream, the configuration and display data is typically provided to local promotion unit 28 periodically (e.g., once per day). The data provided at input 40 preferably includes television schedule data, which can be used to provide a television program guide.

Figure 4:
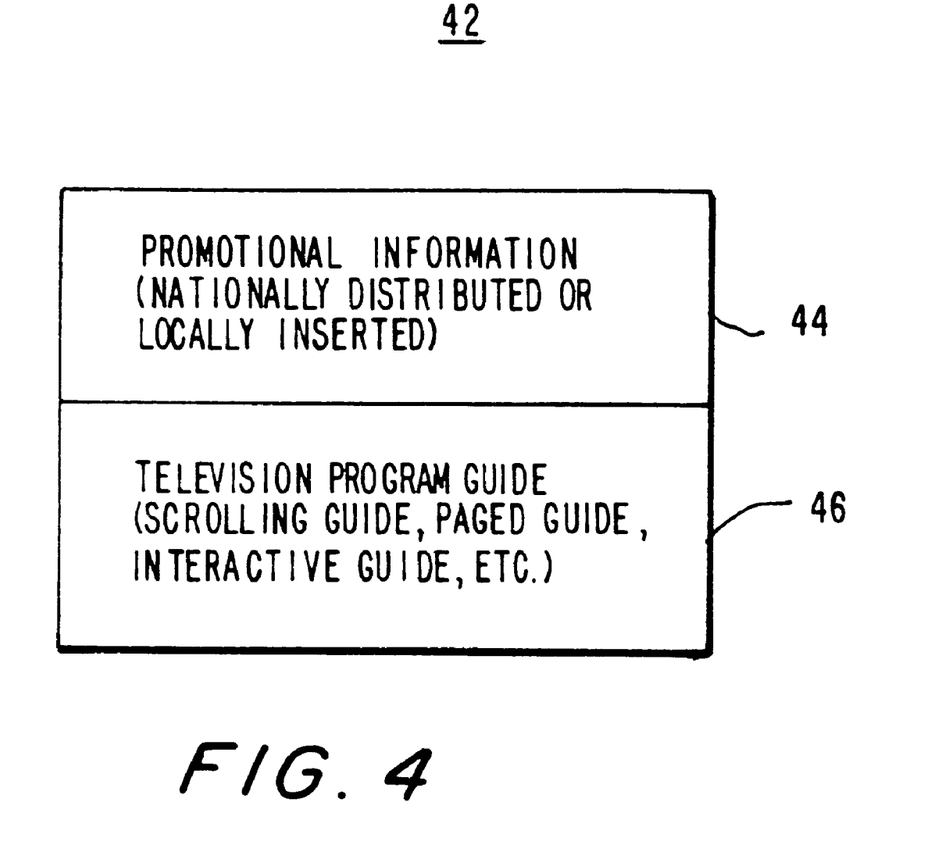
FIG. 4 is a view of an illustrative display screen in accordance with the present invention in which promotional information is displayed on the upper portion of the screen and television program guide information is displayed on the lower portion of the screen.

As shown in FIG. 4, display 42 (which is one of the displays of TV units 24 in FIG. 3) preferably contains promotional information region 44 and television program guide region 46. Promotional information displayed in region 44 includes globally distributed promos and advertisements and locally inserted videos, graphics, and text.

Television program guide listings may be provided in television program guide region 46 as a scrolling list, in the form of a series of successively displayed pages of television program listings, or in the form of an interactive program guide. If a scrolling television program guide format is used, the guide preferably contains a status bar containing the current date and the current time (rounded off to the nearest portion hour). In addition, such a scrolling television program guide preferably contains one grid element per television channel. Each grid element may contain two lines of text. Scrolling television program listings preferably cover about two hours of programming.

If desired, other types of promotional material (e.g., promo videos, national advertisements, etc.) may be substituted for the television program guide in region 46. In addition, the relative sizes of promotional information region 44 and television program guide region 46 may be varied during local insertion, as described in Berezowski et al. U.S. Pat. application Ser. No. 08/816,554, filed Mar. 13, 1997, which is hereby incorporated by reference herein in its entirety.

The configuration and display data provided at input 40 may contain information for displaying weather and messages interspersed with the television program listings. Configuration and display data may also be used for controlling the relative sizes of promotional information region 44 and television program guide region 46, the speed of the program listing scroll (if the program listings are of the scrolled type), the duration of the brief hold period typically used during scrolling, the frequency with which summaries and weather and other such information are displayed in the program guide area, and the look-ahead time for compiling summary information for upcoming television programs (e.g., a two-hour look-ahead or a 48-hour look-ahead, etc.).

Local promotion unit 28 (FIG. 3) allows local promotional information to be inserted in place of the globally distributed promotional information in region 44 of display 42. For example, local promotion unit 28 (FIG. 3) can place graphics, text, or videos from video sources 30 (FIG. 3) on the upper portion of display 42 in place of national video promos (e.g., for pay-per-view of premium channel events). Materials for local insertion may be provided to local promotion unit 28 (FIG. 3) by laser disk, diskette, digital videodisc, videocassette, or any other suitable storage medium or delivery mechanism. The character generator capabilities of local promotion unit 28 (FIG. 3) may be used to generate characters.

Figure 5:
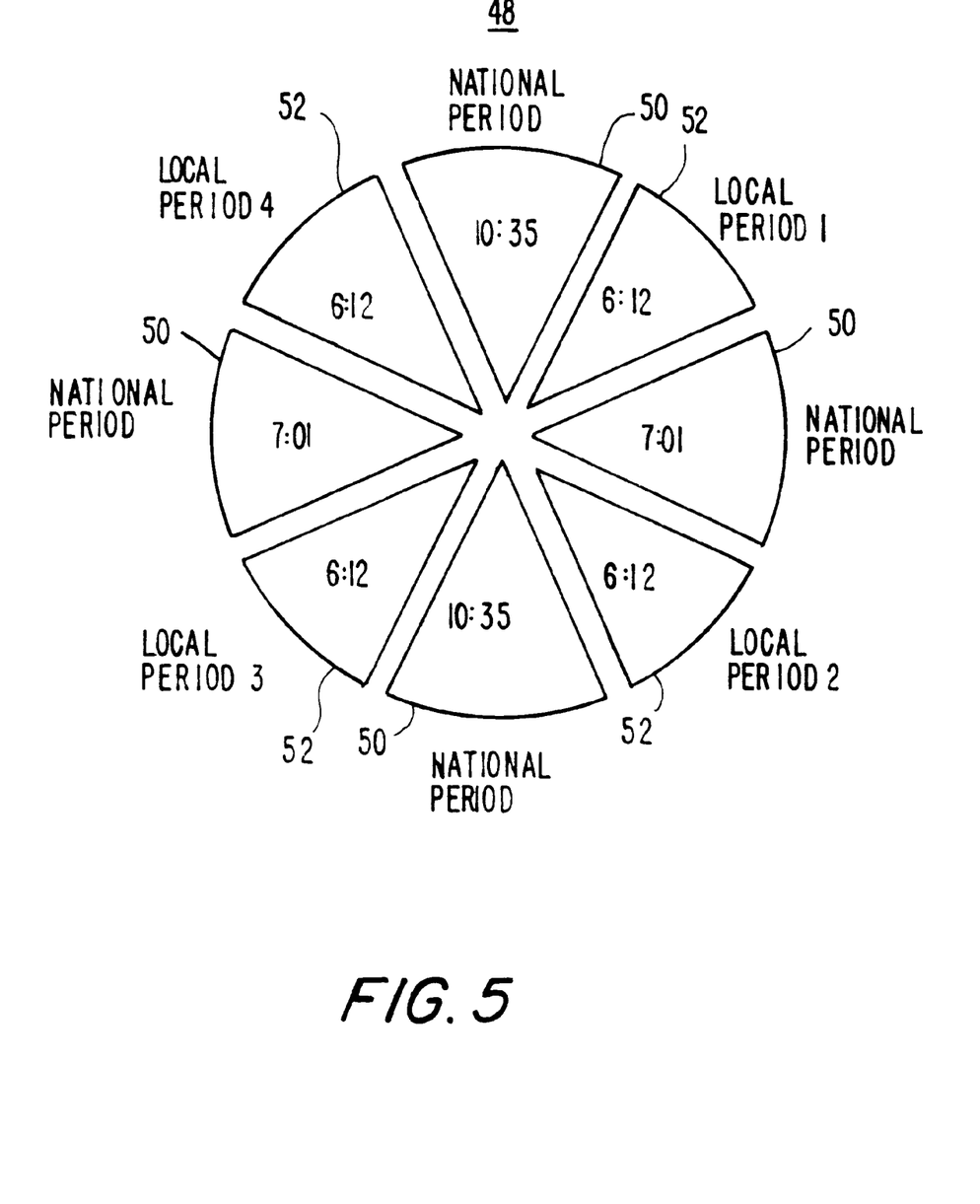
FIG. 5 is a schematic diagram of an illustrative hourly schedule in accordance with the present invention in which periods containing only globally distributed material (national periods) are alternated with periods that contain globally distributed material and local insertions (local periods).

Promotional information and television program guide information is preferably provided to television units 24 (FIG. 3) continuously (i.e., 24 hours per day). Promotional information is displayed according to an hourly schedule. As shown in FIG. 5, the 60 minutes in hourly schedule 48 may be organized in alternating national periods 50 and local periods 52. During national periods 50, promotional information region 44 (FIG. 4) contains globally distributed video promos or advertisements. Globally distributed promotional information is also displayed during local periods 52. However, during each local period 52, there are a number of local insertion opportunities. Local promotion unit 28 (FIG. 3) inserts local promotional information during such local insertion opportunities.

Figure 6:
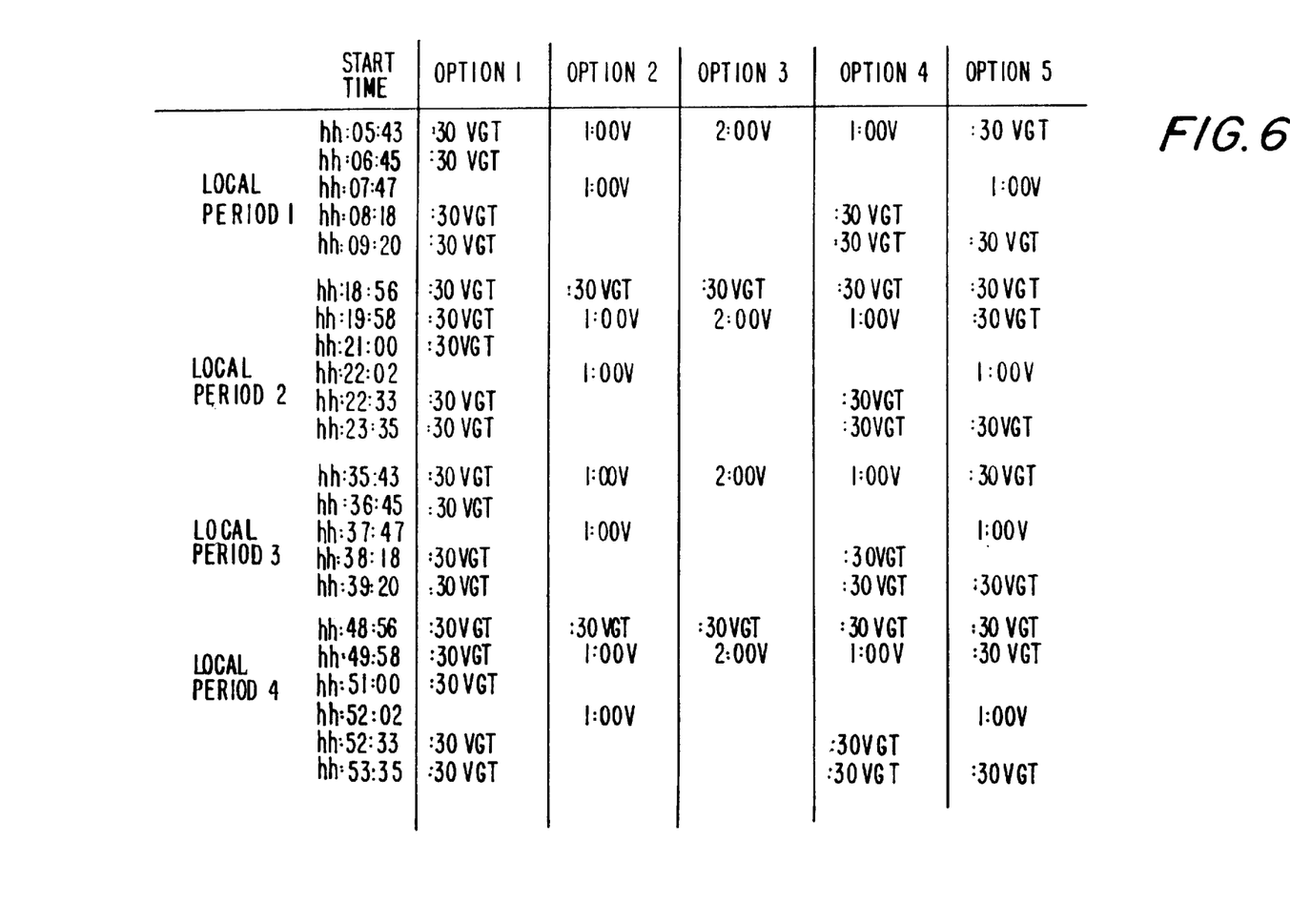
FIG. 6 is a table containing an illustrative local insertion opportunity schedule for a video promotion system in accordance with the present invention.

Multiple local insertion opportunity schedule options are provided by system 16 (FIG. 3), as shown in FIG. 6. Each schedule option contains local insertion opportunities at varying start times and of varying durations. For example, option 1 of FIG. 6 provides 18 30-second local insertion opportunities per hour. Option 2 provides two 30-second local insertion opportunities and eight one-minute (actually 61 second) local insertion opportunities. Option 3 provides two 30-second local insertion opportunities and four two-minute (actually 123 second) insertion opportunities. Options 4 and 5 provide additional insertion opportunity schedules produced by mixing the local insertion opportunities of the previously mentioned options into new permutations.

Video control commands in the video control stream applied to input 38 (FIG. 3) are provided to local promotion unit 28 at each start time listed in the left column of FIG. 6. (In practice, the video control commands are preferably provided eight seconds prior to the desired start times to allow video insertion equipment in the television distribution facility to prepare for local insertion by beginning a tape preroll.) The start times listed in FIG. 6 are given in the format hh:mm:ss, where hh are hours, mm are minutes, and ss are seconds past the beginning of each hour. Local promotion unit 28 synchronizes local insertion of promotional materials using the video control commands.

The video control command information provided for each start time preferably contains information that uniquely identifies each local insertion opportunity available at that start time. For example, if the arrangement of FIG. 6 is used, the video control command issued for time entry hh:19:58 contains information that informs local promotion unit 28 (FIG. 3) that time entry hh:19:58 provides 30s opportunity No. 6, provides 1 min opportunity No. 3, and provides 2min opportunity No. 2. The video control command for time entry hh:37:47 contains information that informs local promotion unit 28 (FIG. 3) that time entry hh:37:47 provides no 30s opportunity, provides 1min opportunity No. 6, and provides no 2min opportunity. Providing local promotion unit 28 (FIG. 3) with information about the nature of each local insertion opportunity allows local promotion unit 28 to handle local insertion opportunities that have varying start times and that have varying durations.

The local insertion opportunities in the table of FIG. 6 are organized in four local periods (local period 1, local period 2, local period 3, and local period 4). The locations of these local periods are shown in hourly insertion schedule 48 of FIG. 5. The pattern of local insertion opportunities provided in local period 1 may be the same as the pattern of local insertion opportunities provided in local period 3. Similarly, the pattern of local insertion opportunities provided in local period 2 may be the same as the pattern of local insertion opportunities provided in local period 4.

In addition to setting forth permitted start times and durations for local insertion opportunities, the local insertion opportunity schedule options of FIG. 6 set forth which types of media may be inserted. For example, the first insertion opportunity for option 1 (i.e., the insertion at start time hh:05:43) is labeled V G T. The label V indicates that video insertions are permitted. The label G indicates that graphics insertions are permitted. The label T indicates that text insertions are permitted. In contrast, the hh:05:43 insertion opportunity for option 2 is labeled V, which indicates that only video insertions are permitted.

The local insertion opportunity schedule options of FIG. 6 allow local promotional information to be inserted even if such information is provided in varying media types. For example, if option 2 is selected, the 1 min insertions at hh:05:43 and hh:07:47 are video insertions. No other types of local insertion are permitted at these opportunities. However, the local insertion opportunity at start time hh:18:56 allows insertions of video, graphics, or text. Option 2 therefore allows different media types to be inserted at different local insertion opportunities.

The operator at television distribution facility 20 (FIG. 3) can select a desired local insertion opportunity schedule option and can specify whether each insertion is video, graphics, or text by informing personnel at main facility 18 (FIG. 3) accordingly. This information is entered into the computer equipment at main facility 18 that is used to support the video promotion service. Once an option has been selected, corresponding configuration data is provided to local promotion unit 28 (FIG. 3) at input 40.

Using the local insertion opportunity schedule options of FIG. 6 is but one illustrative way in which to allow an operator at a given television distribution facility to select a mix of local insertion media types and to provide local insertion opportunities of varying durations and start times. Any suitable arrangement may be used to provide a user with the ability to modify the local insertion media types permitted and to provide insertion opportunities having variable start times and durations. If desired, additional or alternative local insertion opportunity schedule options may be provided. A user may also be provided with the ability to customize a local insertion opportunity schedule.

The foregoing is merely illustrative of the principles of this invention and various modifications can be made by those skilled in the art without departing from the scope and spirit of the invention. For example, although insertions times of 30 seconds, one minute/60 seconds (actually 61 seconds), and two minutes/120 seconds (actually 123 seconds) are preferred, other durations may be used if desired. The durations that are used may be configurable from main facility 18. In addition, the number of insertion duration types (e.g., three in FIG. 6) may be changed to any suitable number and may be configurable from main facility 18. For example, a four minute (actually 245 second) local insertion opportunity may be provided by changing the appropriate configuration commands that are delivered to facility 20 from facility 18. Further, the number of pie slices and their durations (i.e., six slices of ten minutes each in FIG. 2) may be changed to any desired configuration and may be configurable from main facility 18.

What is claimed is:

1. A system for providing globally distributed promotional information to television units on a given channel and allowing local promotional information to be inserted in place of the globally distributed promotional information during local insertion opportunities, comprising:

means for providing the globally distributed promotional information;

a plurality of television distribution facilities, each having an operator, and each connected to a plurality of associated television units, each television distribution facility receiving the globally distributed promotional information and providing the globally distributed promotional information to the television units on the given channel so that the globally distributed promotional information is displayed by the television units; and means for providing a given one of the television distribution facilities with local insertion opportunities, the local insertion opportunities being the maximum period of time allowed for the given one of the television distribution facilities to insert local promotional information that is displayed by the television units associated with the given one of the television distribution facilities in place of the globally distributed promotional information, wherein durations of the local insertion opportunities are selected by the operator.

2. The system defined in claim 1 wherein the means for providing the globally distributed promotional information comprises a satellite uplink facility that supplies global video and audio streams of promotional information.

3. The system defined in claim 1 wherein the television distribution facilities each further comprise means for providing television program guide information to the television units over the given channel.

4. The system defined in claim 1 further comprising means for providing a scrolling television program guide over the given channel for display on the television units.

5. The system defined in claim 1 further comprising means for providing the given one of the television distribution facilities with a plurality of local insertion opportunity schedule options that are selectable by the operator.

6. The system defined in claim 1 further comprising means for providing the given one of the television distribution facilities with local insertion opportunities, wherein start times of the local insertion opportunities are selected by the operator.

7. The system defined in claim 1 further comprising means for providing the given one of the television distribution facilities with local insertion opportunities, wherein at least two of the local insertion opportunities for the given one of the television distribution facilities have different media types available for insertion, and wherein media types other than those available for insertion in a given local insertion opportunity may not be inserted by the given one of the television distribution facilities.

8. The system defined in claim 1 further comprising means for providing the given one of the television distribution facilities with local insertion opportunities, wherein at least one of the local insertion opportunities has video, graphics, and text available for insertion.

9. A system for providing globally distributed promotional information to television units on a given channel and allowing local promotional information to be inserted in place of the globally distributed promotional information during local insertion opportunities, comprising:
    means for providing the globally distributed promotional information;
    a plurality of television distribution facilities, each having an operator, and each connected to a plurality of associated television units, each television distribution facility receiving the globally distributed promotional information and providing the globally distributed promotional information to the television units on the given channel so that the globally distributed promotional information is displayed by the television units; and
    means for providing a given one of the television distribution facilities with local insertion opportunities, the local insertion opportunities being the maximum period of time allowed for the given one of the television distribution facilities to insert local promotional information that is displayed by the television units associated with the given one of the television distribution facilities in place of globally distributed promotional information, wherein start times of the local insertion opportunities are selected by the operator.

10. The system defined in claim 9 further comprising means for providing the given one of the television distribution facilities with local insertion opportunities, wherein at least two of the local insertion opportunities for the given one of the television distribution facilities have different media types available for insertion, and wherein media types other than those available for insertion in a given local insertion opportunity may not be inserted by the given one of the television distribution facilities.

11. The system defined in claim 10 further comprising means for providing the given one of the television distribution facilities with local insertion opportunities, wherein durations of the local insertion opportunities are selected by the operator.

12. The system defined in claim 9 wherein the means for providing the globally distributed promotional information comprises a satellite uplink facility that supplies global video and audio streams of promotional information.

13. The system defined in claim 9 wherein the television distribution facilities each further comprise means for providing television program guide information to the television units over the given channel.

14. The system defined in claim 9 further comprising means for providing a scrolling television program guide over the given channel for display on the television units.

15. The system defined in claim 9 further comprising means for providing the given one of the television distribution facilities with a plurality of local insertion opportunity schedule options that are selectable by the operator.

16. The system defined in claim 9 further comprising means for providing the given one of the television distribution facilities with local insertion opportunities, wherein at least one of the local insertion opportunities has video, graphics, and text available for insertions.

17. A system for providing globally distributed promotional information to television units on a given channel and allowing local promotional information to be inserted in place of the globally distributed promotional information during local insertion opportunities, comprising:
    means for providing the globally distributed promotional information;
    a plurality of television distribution facilities, each connected to a plurality of associated television units, each television distribution facility receiving the globally distributed promotional information and providing the globally distributed promotional information to the television units on the given channel so that the globally distributed promotional information is displayed by the television units; and
    means for providing a given one of the television distribution facilities with local insertion opportunities, the local insertion opportunities being the maximum period of time allowed for the given one of the television distribution facilities to insert local promotional information that is displayed by the television units associated with the given one of the television distribution facilities in place of the globally distributed promotional information, wherein at least two of the local insertion opportunities for the given one of the television distribution facilities have different media types available for insertion, and wherein media types other than those available for insertion in a given local insertion opportunity may not be inserted by the given one of the television distribution facilities.

18. The system defined in claim 17 wherein the means for providing the globally distributed promotional information comprises a satellite uplink facility that supplies global video and audio streams of promotional information.

19. The system defined in claim 17 wherein the television distribution facilities each further comprise means for providing television program guide information to the television units over the given channel.

20. The system defined in claim 17 further comprising means for providing a scrolling television program guide over the given channel for display on the television units.

21. The system defined in claim 17 further comprising means for providing the given one of the television distribution facilities with a plurality of local insertion opportunity schedule options that are selectable by the television distribution facility operator.

22. The system defined in claim 17 further comprising means for providing the given one of the television distribution facilities with local insertion opportunities, wherein at least one of the local insertion opportunities has video, graphics, and text available for insertion.

23. A method for providing globally distributed promotional information to television units on a given channel and allowing local promotional information to be inserted in place of the globally distributed promotional information during local insertion opportunities, comprising the steps of:
    providing the globally distributed promotional information;

receiving the globally distributed promotional information with a plurality of television distribution facilities, each having an operator, and each connected to a plurality of associated television units;

providing the globally distributed promotional information to the television units on the given channel so that the globally distributed promotional information is displayed by the television units;

providing a given one of the television distribution facilities with local insertion opportunities, the local insertion opportunities being the maximum period of time allowed for the given one of the television distribution facilities to insert local promotional information that is displayed by the television units associated with the given one of the television distribution facilities in place of the globally distributed promotional information; and enabling the operator of the given one of the television distribution facilities to select durations of the local insertion opportunities.

24. The method defined in claim 23 wherein the step of providing the globally distributed promotional information comprises the step of supplying global video and audio streams of promotional information.

25. The method defined in claim 23 further comprising the step of providing television program guide information to the television units over the given channel.

26. The method defined in claim 23 further comprising the step of providing a scrolling television program guide over the given channel for display on the television units.

27. The method defined in claim 23 further comprising the step of providing the given one of the television distribution facilities with a plurality of local insertion opportunity schedule options that are selectable by the operator.

28. The method defined in claim 23 further comprising the step of enabling the operator of the given one of the television distribution facilities to select start times of the local insertion opportunities.

29. The method defined in claim 23 further comprising the step of providing the given one of the television distribution facilities with local insertion opportunities, wherein at least two of the local insertion opportunities for the given one of the television distribution facilities have different media types available for insertion, and wherein media types other than those available for insertion in a given local insertion opportunity may not be inserted by the given one of the television distribution facilities.

30. The method defined in claim 23 further comprising the step of providing the given one of the television distribution facilities with local insertion opportunities, wherein at least one of the local insertion opportunities has video, graphics, and text available for insertion.

31. A method for providing globally distributed promotional information to television units on a given channel and allowing local promotional information to be inserted in place of the globally distributed promotional information during local insertion opportunities, comprising the steps of:

providing the globally distributed promotional information;

receiving the globally distributed promotional information with a plurality of television distribution facilities, each having an operator, and each connected to a plurality of associated television units;

providing the globally distributed promotional information to the television units on the given channel so that the globally distributed promotional information is displayed by the television units;

providing a given one of the television distribution facilities with local insertion opportunities, the local insertion opportunities being the maximum period of time allowed for the given one of the television distribution facilities to insert local promotional information that is displayed by the television units associated with the given one of the television distribution facilities in place of the globally distributed promotional information; and enabling the operator of the given one of the television distribution facilities to select start times of the local insertion opportunities.

32. The method defined in claim 31 further comprising the step of providing the given one of the television distribution facilities with local insertion opportunities, wherein at least two of the local insertion opportunities for the given one of the television distribution facilities have different media types available for insertion, and wherein media types other than those available for insertion in a given local insertion opportunity may not be inserted by the given one of the television distribution facilities.

33. The method defined in claim 32 further comprising the step of enabling the operator of the given one of the television distribution facilities to select durations of the local insertion opportunities.

34. The method defined in claim 31 wherein the step of providing the globally distributed promotional information further comprises the step of supplying global video and audio streams of promotional information.

35. The method defined in claim 31 further comprising the step of providing television program guide information to the television units over the given channel.

36. The method defined in claim 31 further comprising the step of providing a scrolling television program guide over the given channel for display on the television units.

37. The method defined in claim 31 further comprising the step of providing the given one of the television distribution facilities with a plurality of local insertion opportunity schedule options that are selectable by the operator.

38. The method defined in claim 31 further comprising the step of providing the given one of the television distribution facilities with local insertion opportunities, wherein at least one of the local insertion opportunities has video, graphics, and text available for insertion.

39. A method for providing globally distributed promotional information to television units on a given channel and allowing local promotional information to be inserted in place of the globally distributed promotional information during local insertion opportunities, comprising the steps of:

providing the globally distributed promotional information;

receiving the globally distributed promotional information with a plurality of television distribution facilities, each connected to a plurality of associated television units;

providing the globally distributed promotional information to the television units on the given channel so that the globally distributed promotional information is displayed by the television units; and providing a given one of the television distribution facilities with local insertion opportunities, the local insertion opportunities being the maximum period of time allowed for the given one of the television distribution facilities to insert local promotional information that is displayed by the television units associated with the given one of the television distribution facilities in place of the globally distributed promotional information, wherein at least two of the local insertion opportunities for the given one of the television distribution facilities have different media types available for insertion, and wherein media types other than those available for insertion in a given local insertion opportunity may not be inserted by the given one of the television distribution facilities.

40. The method defined in claim 39 wherein the step of providing the globally distributed promotional information further comprises the step of supplying global video and audio streams of promotional information.

41. The method defined in claim 39 further comprising the step of providing television program guide information to the television units over the given channel.

42. The method defined in claim 39 further comprising the step of providing a scrolling television program guide over the given channel for display on the television units.

43. The method defined in claim 39 further comprising the step of providing the given one of the television distribution facilities with a plurality of local insertion opportunity schedule options that are selectable by the television distribution facility operator.

44. The method defined in claim 39 further comprising the step of providing the given one of the television distribution facilities with local insertion opportunities, wherein at least one of the local insertion opportunities has video, graphics, and text available for insertion.

45. A system for providing globally distributed promotional information to television units on a given channel and allowing local promotional information to be inserted in place of the globally distributed promotional information during local insertion opportunities, comprising:
   a transmitter for providing the globally distributed promotional information; and
   a plurality of television distribution facilities, each having an operator, and each connected to a plurality of associated television units, each television distribution facility receiving the globally distributed promotional information and providing the globally distributed promotional information to the television units on the given channel so that the globally distributed promotional information is displayed by the television units, wherein a given one of the television distribution facilities is provided with local insertion opportunities, the local insertion opportunities being the maximum period of time allowed for the given one of the television distribution facilities to insert local promotional information that is displayed by the television units associated with the given one of the television distribution facilities in place of the globally distributed promotional information, wherein durations of the local insertion opportunities are selected by the operator.

46. The system defined in claim 45 wherein the transmitter for providing the globally distributed promotional information comprises a satellite uplink facility that supplies global video and audio streams of promotional information.

47. The system defined in claim 45 wherein the television distribution facilities provide television program guide information to the television units over the given channel.

48. The system defined in claim 45 wherein a scrolling television program guide is provided for display to the television units over the given channel.

49. The system defined in claim 45 wherein the given one of the television distribution facilities is provided with a plurality of local insertion opportunity schedule options that are selectable by the operator.

50. The system defined in claim 45 wherein the given one of the television distribution facilities is provided with local insertion opportunities, wherein start times of the local insertion opportunities are selected by the operator.

51. The system defined in claim 45 wherein the given one of the television distribution facilities is provided with local insertion opportunities, wherein at least two of the local insertion opportunities for th e given one of the television distribution facilities have different media types available for insertion, and wherein media types other than those available for insertion in a given local insertion opportunity may not be inserted by the given one of the television distribution facilities.

52. The system defined in claim 45 wherein the given one of the television distribution facilities is provided with local insertion opportunities, wherein at least one of the local insertion opportunities has video, graphics, and text available for insertion.

53. A system for providing globally distributed promotional information to television units on a given channel and allowing local promotional information to be inserted in place of the globally distributed promotional information during local insertion opportunities, comprising:
   a transmitter for providing the globally distributed promotional information; and
   a plurality of television distribution facilities, each having an operator, and each connected to a plurality of associated television units, each television distribution facility receiving the globally distributed promotional information and providing the globally distributed promotional information to the television units on the given channel so that the globally distributed promotional information is displayed by the television units, wherein a given one of the television distribution facilities is provided with local insertion opportunities, the local insertion opportunities being the maximum period of time allowed for the given one of the television distribution facilities to insert local promotional information that is displayed by the television units associated with the given one of the television distribution facilities in place of the globally distributed promotional information, wherein start times of the local insertion opportunities are selected by the operator.

54. The system defined in claim 53 wherein the given one of the television distribution facilities is provided with local insertion opportunities, wherein at least two of the local insertion opportunities for the given one of the television distribution facilities have different media types available for insertion, and wherein media types other than those available for insertion in a given local insertion opportunity may not be inserted by the given one of the television distribution facilities.

55. The system defined in claim 54 wherein the given one of the television distribution facilities is provided with local insertion opportunities, wherein durations of the local insertion opportunities are selected by the operator.

56. The system defined in claim 53 wherein the transmitter for providing the globally distributed promotional information comprises a satellite uplink facility that supplies global video and audio streams of promotional information.

57. The system defined in claim 53 wherein the television distribution facilities provide television program guide information to the television units over the given channel.

58. The system defined in claim 53 wherein a scrolling television program guide is provided for display to the television units over the given channel.

59. The system defined in claim 53 wherein the given one of the television distribution facilities is provided with a plurality of local insertion opportunity schedule options that are selectable by the operator.

60. (The system defined in claim 53 wherein the given one of the television distribution facilities is provided with local insertion opportunities, wherein at least one of the local insertion opportunities has video, graphics, and text available for insertion.

61. A system for providing globally distributed promotional information to television units on a given channel and allowing local promotional information to be inserted in place of the globally distributed promotional information during local insertion opportunities, comprising:

a transmitter for providing the globally distributed promotional information; and a plurality of television distribution facilities, each connected to a plurality of associated television units, each television distribution facility receiving the globally distributed promotional information and providing the globally distributed promotional information to the television units on the given channel so that the globally distributed promotional information is displayed by the television units, wherein a given one of the television distribution facilities is provided with local insertion opportunities, the local insertion opportunities being the maximum period of time allowed for the given one of the television distribution facilities to insert local promotional information that is displayed by the television units associated with the given one of the television distribution facilities in place of the globally distributed promotional information, wherein at least two of the local insertion opportunities for the given one of the television distribution facilities have different media types available for insertion, and wherein media types other than those available for insertion in a given local insertion opportunity may not be inserted by the given one of the television distribution facilities.

62. The system defined in claim 61 wherein the transmitter for providing the globally distributed promotional information comprises a satellite uplink facility that supplies global video and audio streams of promotional information.

63. The system defined in claim 61 wherein the television distribution facilities provide television program guide information to the television units over the given channel.

64. The system defined in claim 61 wherein a scrolling television program guide is provided for display to the television units over the given channel.

65. The system defined in claim 61 wherein the television distribution facilities are provided with a plurality of local insertion opportunity schedule options that are selectable by the television distribution facility operator.

66. The system defined in claim 61 wherein the television distribution facility is provided with local insertion opportunities, wherein at least one of the local insertion opportunities has video, graphics, and text available for insertion.

* * * * *

UNITED STATES PATENT AND TRADEMARK OFFICE
CERTIFICATE OF CORRECTION

PATENT NO. : 6,075,551
DATED : June 13, 2000
INVENTOR(S) : David Michael Berezowski et al.

It is certified that error appears in the above-identified patent and that said Letters Patent is hereby corrected as shown below:

Column 1,
Line 46, change "operator" to -- operators --.

Column 7,
Lines 10 and 30, remove bold style on "30".
Lines 11 and 15, remove bold style on "6".
Lines 11 and 46, change "1 min" to -- 1min --.
Lines 11, 23 and 27, remove bold style on "3".
Lines 12, 23, 29, 35, 40 and 51, remove bold style on "2".
Lines 22, 26 and 35, remove bold style on "1".
Lines 23 and 30, remove bold style on "4".

Column 10,
Line 9, change "insertions" to -- insertion --.

Column 14,
Line 8, change "th e" to -- the --.

Column 15,
Line 5, change "(The system" to -- The system --.

Signed and Sealed this

Twenty-eighth Day of January, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,075,551
DATED : June 13, 2000
INVENTOR(S) : David Michael Berezowski et al.

It is certified that error appears in the above-identified patent and that said Letters Patent is hereby corrected as shown below:

Column 1,
Line 46, change "operator" to -- operators --.

Column 7,
Lines 10 and 15, remove bold style on "30".
Lines 11 and 15, remove bold style on "6".
Lines 11 and 46, change "1 min" to -- 1min --.
Lines 11, 23 and 27, remove bold style on "3".
Lines 12, 23, 29, 35, 40, 46 and 51, remove bold style on "2".
Lines 22, 26 and 35, remove bold style on "1".
Lines 23 and 30, remove bold style on "4".

Column 10,
Line 9, change "insertions" to -- insertion --.

Column 14,
Line 8, change "th e" to -- the --.

Column 15,
Line 5, change "(The system" to -- The system --.

This certificate supersedes Certificate of Correction issued January 28, 2003.

Signed and Sealed this

Seventeenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,075,551
DATED : June 13, 2000
INVENTOR(S) : David Michael Berezowski et al.

It is certified that error appears in the above-identified patent and that said Letters Patent is hereby corrected as shown below:

Column 1,
Line 46, change "operator" to -- operators --.

Column 7,
Lines 10 and 15, remove bold style on "30".
Lines 11 and 15, remove bold style on "6".
Lines 11 and 46, change "1 min" to -- 1min --.
Lines 11, 23 and 27, remove bold style on "3".
Lines 12, 23, 29, 40, 46 and 51, remove bold style on "2".
Lines 22, 26 and 35, remove bold style on "1".
Lines 23 and 30, remove bold style on "4".

Column 10,
Line 9, change "insertions" to -- insertion --.

Column 14,
Line 8, change "th e" to -- the --.

Column 15,
Line 5, change "(The system" to -- The system --.

This certificate supersedes Certificate of Correction issued June 17, 2003.

Signed and Sealed this

Thirtieth Day of September, 2003

JAMES E. ROGAN
*Director of the United States Patent and Trademark Office*